Oct. 18, 1966

C. A. KAPLAN 3,279,350

TOASTER

Filed Sept. 3, 1963

CHARLES A. KAPLAN, Inventor

By Arthur Jacob

Patent Attorney

Oct. 18, 1966 C. A. KAPLAN 3,279,350
TOASTER
Filed Sept. 3, 1963 4 Sheets-Sheet 3

CHARLES A. KAPLAN, Inventor

By Arthur Jacob
Patent Attorney

Oct. 18, 1966 C. A. KAPLAN 3,279,350
TOASTER

Filed Sept. 3, 1963 4 Sheets-Sheet 4

CHARLES A. KAPLAN, Inventor

By *Arthur Jacob*

Patent Attorney

3,279,350
TOASTER

Charles A. Kaplan, Somerset, N.J., assignor to Samuelson & Jacob, a partnership of Cyrus D. Samuelson and Arthur Jacob, both of Hackensack, N.J.
Filed Sept. 3, 1963, Ser. No. 306,027
4 Claims. (Cl. 99—390)

The present invention relates generally to toasting appliances and pertains, more specifically, to a toaster capable of accommodating items of various sizes within the body of the toaster for effectively toasting such items.

Ordinary toasting appliances found in the home generally provide one or more slots for receiving items to be toasted. The dimensions of the items which can be accommodated in each slot are limited by the dimensions of the slot itself. Thus, where the thickness of a slice of bread, a roll, a bun or even a piece of cake, exceeds the width of a slot, the toaster cannot accommodate the item. Furthermore, in some instances, the dimensions of the item so closely approach the dimensions of a slot in the toaster that a user may attempt to force the item into the toaster with the result that the item becomes jammed in the toaster and the user becomes vexed.

An obvious solution to such difficulties would be to provide a slot having dimensions great enough to accommodate the largest items likely to be toasted; however, most toasters employ electrically operated heating elements which, for optimum performance, must be located within a reasonable distance of the item to be toasted. Thus, a very wide slot would require an excessive spacing between the heating elements thereby reducing the effectiveness of the toaster in toasting items of a more narrow width and the obvious solution becomes impractical.

It is therefore an important object of the invention to provide a toaster capable of effectively toasting items of various dimensions.

Another object of the invention is to provide a toaster capable of effectively accommodating items of various sizes through the employment of a unique structural arrangement which lends itself readily to incorporation within commonly accepted toaster constructions.

Still another object of the invention is to provide a toaster construction which allows easy release of items which may become jammed within the toaster.

A further object of the invention is to provide a toaster capable of effectively accommodating items of various sizes through the employment of a structural arrangement which is simple to use and readily fabricated.

The invention may be described briefly as a toaster capable of selectively toasting items of various sizes. The toaster has a body provided with at least one slot capable of receiving the item for toasting, the slot having predetermined maximum dimensions. A panel is provided in the body contiguous with the slot and means removably retain the panel in the body. The panel is selectively removable from the body to increase at least one of the dimensions of the slot for accommodating an item of a size having at least one dimension greater than the corresponding predetermined maximum dimension of the slot.

The invention will be more fully understood, and further objects and advantages will become apparent, in the following detailed description of an embodiment of the invention illustrated in accompanying drawings in which.

Figure 1:
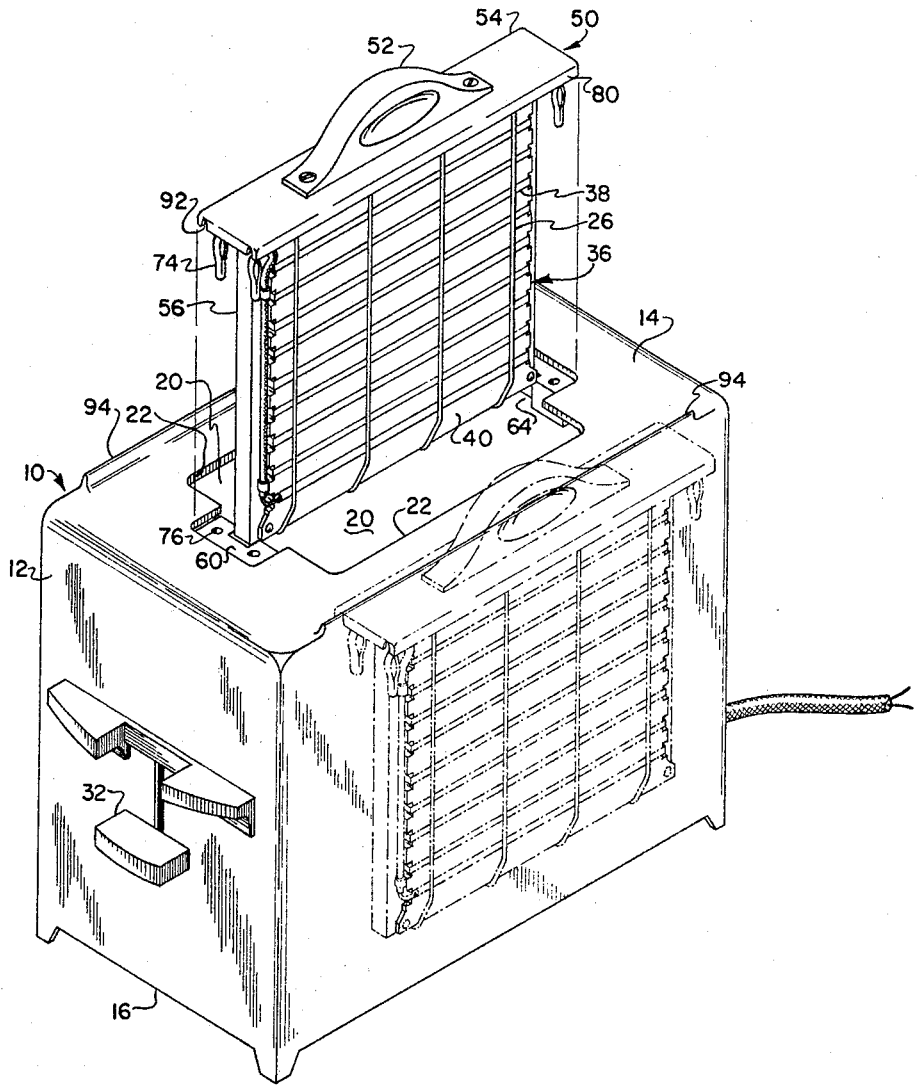
FIGURE 1 is a perspective view of a toaster constructed in accordance with the invention, certain components being indicated in phantom in an alternative position.
Figure 2:
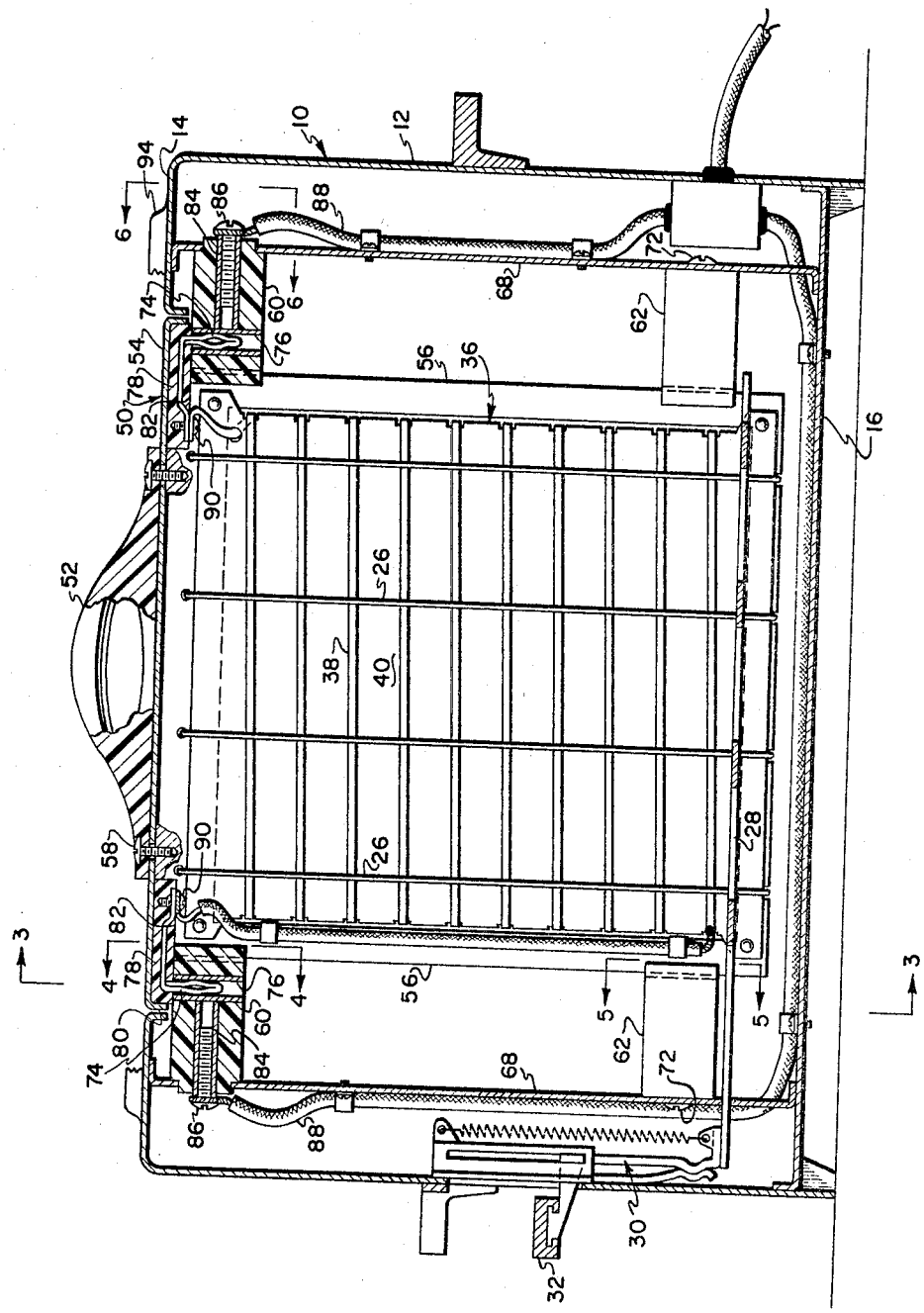
FIGURE 2 is an elevational sectional view of the toaster of FIGURE 1 taken along line 2—2 of FIGURE 3.
Figure 3:
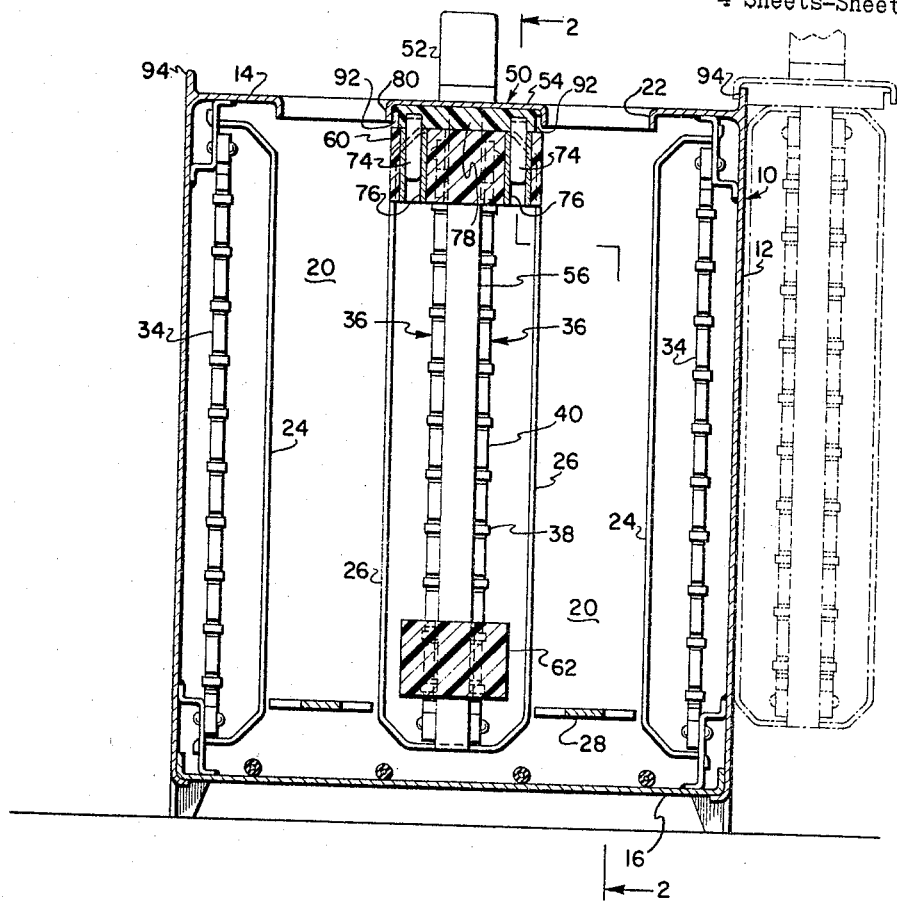
FIGURE 3 is an elevational sectional view along line 3—3 of FIGURE 2.

Referring to the drawings, and particularly to FIGURES 1 through 3, a toaster constructed in accordance with the invention is designated generally at 10. Toaster 10 has a body 12 with a top 14 and base 16 and, in the normal configuration shown best in FIGURE 3, the body is provided with two parallel slots 20 capable of receiving items to be toasted, such as, for example, slices of bread, rolls, buns or cake. In the normal configuration, the toaster 10 operates in a manner very similar to conventional toasters now in use in many households. Each of the two slots 20 has an inlet 22 of fixed length and width for admitting an item into the slot, each slot having opposite inner and outer sides, the outer sides being defined by guides 24 and the inner sides being defined by guides 26. An item to be toasted is inserted into a slot 20 and will be guided in an upright position by guides 24 and 26 to a platen 28 upon which the item will rest. The platen 28 is movable in a vertical direction by means of mechanism 30 (see FIGURE 2) which is actuated by lever 32 to selectively lower and automatically raise an item into and out of a slot in a manner now well known in the art of toasters.

In order to accomplish the toasting function, electrically operated heating elements are located adjacent each side of each slot, elements 34 being fixed within body 12 adjacent the outer sides of slots 20 and elements 36 adjacent the inner sides. Each heating element is constructed of an electrically conductive resistance heating ribbon 38 wound upon a board 40 of insulating material and is connected to a source of electrical current through a switch 42 (see FIGURE 7) that is generally operated in conjunction with a timing device (not shown) which not only times the toasting cycle but actuates the mechanism 30 to deliver the toasted item at the end of the timed cycle. The guides 24 and 26 maintain the item to be toasted at a proper distance away from the heating elements so as to prevent contact between the item and an element and aid in establishing optimum toasting conditions.

The dimensions of each slot 20 are chosen to accommodate the average size item which is expected to be toasted in an ordinary household. In particular, the width of an inlet 22 and the distance between corresponding guides 24 and 26 are each fixed at a predetermined magnitude capable of properly toasting a wide variety of items. However, at times it is desired to toast items of a width greater than that of the slot 20, and toaster 10 provides a unique departure from common toaster constructions for conveniently accommodating such items. The departure is in the form of a selectively removable panel 50 which is normally fixed in place within body 12 between slots 20, as shown in FIGURES 2 and 3, but which may be selectively removed from the body by merely pulling upwardly upon handle 52, as illustrated in FIGURE 1, so that body 12 is left with a single slot having a width which is the sum of the widths of slots 20 and panel 50. The remaining wide slot can then be employed to accommodate those items which are too wide to be received in slots 20. It will be apparent that the removal of panel 50 does not disturb the regular operation of the toaster as a single-slotted automatic toaster having electrically operated heating elements 34 and guides 24.

As best seen in FIGURES 1, 2 and 3, panel 50 is made up of a cover plate 54 which is normally flush with the top 14 of body 12, and a frame 56 depending downwardly from the cover plate and secured thereto by screws 58 which also fix handle 52 in place. Guides 26, which define the inner sides of slots 20, are fixed in the frame 56 and heating elements 36 are secured to the frame adjacent the guides 26.

Figure 4:
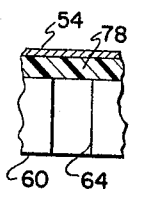
FIGURE 4 is a fragmentary sectional view taken along line 4—4 of FIGURE 2.
Figure 5:
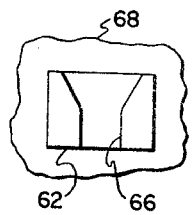
FIGURE 5 is a fragmentary sectional view taken along line 5—5 of FIGURE 2.
Figure 6:
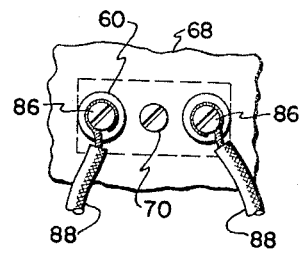
FIGURE 6 is a fragmentary sectional view taken along line 6—6 of FIGURE 2.

In order to properly locate panel 50 in place within body 12, upper and lower locator blocks 60 and 62, respectively, are fixed in place within body 12, the upper locator blocks 60 each having a groove 64 (see FIGURE 4) for receiving an edge of the frame 56 and the lower locator blocks 62 each having a groove 66 (see FIGURE 5) which is tapered at its upper end to ease the reception and alignment of frame 56 into a properly located position within the body. As best seen in FIGURE 6, each upper locator block 60 is fixed to a structural member 68 of body 12 by means of a screw 70 passing through the structural member into the block. Lower locator blocks 62 are similarly secured in place by screws 72. Thus grooves 64 and 66 provide ways for frame 56 which is readily slipped into place guided by the ways.

The panel 50 is secured in place within the body and the heating elements 36 electrically connected when the panel is so secured by means of plugs 74 engaging sockets 76, as best seen in FIGURES 2 and 3. Plugs 74 are radially resiliently expansible and have a slightly larger normal diameter than socket 76 so that when each plug 74 is engaged with a corresponding socket 76 not only is an electrical circuit completed between each heater element 36 and the remainder of the toaster circuit as illustrated schematically in FIGURE 7, but panel 50 is mechanically secured in place by virtue of the frictional gripping force established when each plug is contracted radially to fit its socket. The plugs 74 are fixed within insulator blocks 78 which are held in place in panel 50 by lip 80 bordering cover plate 54, and portions 82 of frame 56. As shown, sockets 76 are fixed within locator blocks 60, which are also fabricated of a dielectric material, the sockets being electrically connected to sleeves 84 which receive screws 86 for securing and electrically connecting conductors 88 to the heating elements 36 through sleeves 84, sockets 76 and plugs 74 which are electrically connected to the ribbons 38 at screws 90.

As explained above, when it is desired to toast an item having a width greater than the width of either of the slots 20, panel 50 is merely removed from body 12 and a single, extra-wide slot remains. However, even when toaster 10 is being utilized in its normal two-slotted configuration, it is possible that items which approach the width of slots 20 will be placed in the toaster and these items could become jammed within the toaster. Such items can now be easily removed by merely lifting out panel 50 to release the jammed items. It is noted that when such a procedure is followed, the heating elements 36 are likely to be warm when the panel is removed. Thus, it has been found convenient to provide a safe and effective resting place for the panel integral with the toaster by providing notches 92 passing through lip 80 of cover plate 54 and insulator blocks 78 (see FIGURES 1 and 3) which can cooperate with either of the ridges 94 placed along edges of top 14 of the body to hang panel 50 from the toaster as illustrated in phantom in FIGURES 1 and 3. Guides 26 will maintain the heated ribbon 38 at a distance from the body so as to protect against any damage to either the heating element 36 or the body 12.

Figure 7:
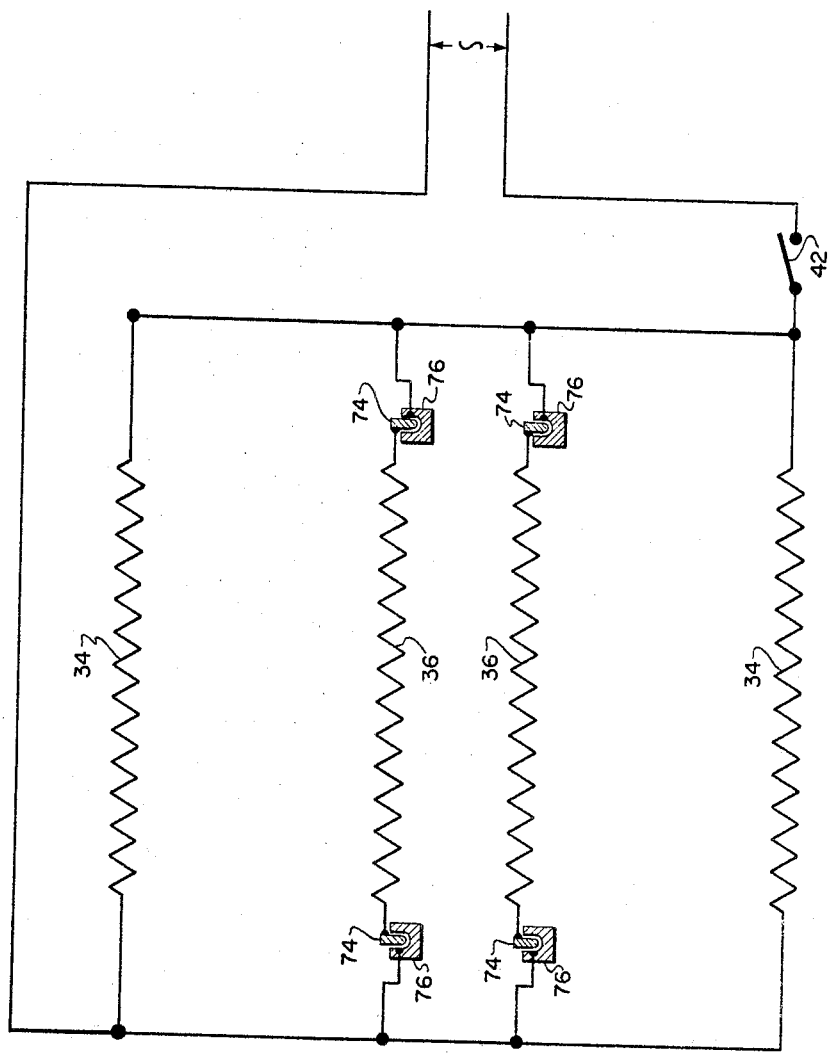
FIGURE 7 is a schematic circuit diagram of the toaster of FIGURES 1 through 6.

As shown in FIGURE 7, each heating element is wired in parallel with the others so that an equal voltage is applied to all. When panel 50 is removed from toaster 10, thereby removing elements 36 from the circuit, the voltage across heating elements 34 is not altered and the toaster may continue to operate as a single-slotted device with an electrically operated heating element adjacent each side of the single slot.

Thus, toaster 10 provides a unique departure from conventional toaster constructions in order to allow the accommodation of items of various sizes; however, the departure is not so drastic as to be incompatible with generally accepted toaster design and operation and is capable of easy fabrication as well as convenient use.

It is to be understood that the above detailed description of an embodiment of the invention is provided by way of example only and is not intended to restrict the invention. Modifications may be made in various details of design and construction without departing from the true spirit and scope of the invention as defined in the appended claims.

I claim:
1. A toaster capable of selectively toasting items of various sizes, said toaster comprising:
   a body having a top;
   first and second slots in said body extending vertically downwardly from said top into said body, each said slot having vertically extending sides and a predetermined width between said sides;
   electrical heating means connected in a circuit and located adjacent each side of each slot for toasting items received within the slots;
   a platen including portions movable vertically within each slot for supporting an item to be toasted in each slot;
   a panel in said body extending vertically downwardly from said top into said body between said slots and contiguous therewith to establish one side of each slot, said panel having an appreciable width in comparison to the width of said slots, the heating means adjacent said one side of each slot being fixed to said panel; and
   securing means removably retaining said panel in place in said body between said slots for ready removal from the body;
   said panel being readily selectively removable from said body by vertical displacement of the panel from the body along with the electrical heating means fixed thereto such that said body is left with a third slot having a width equal to the sum of the widths of said first and second slots and said panel when said panel is removed from said body to accommodate items of greater width than the width of either said first or second slot whereby a single item of increased width may be supported by said platen portions in said third slot.

2. The toaster of claim 1 wherein the securing means are located adjacent the top of the body and the panel and are electrically connected with the heating means fixed to the panel for electrically connecting the electrical heating means fixed to the panel into the circuit when the panel is retained in place in said body and disconnecting said heating means when said panel is removed from said body.

3. A toaster capable of selectively toasting items of various sizes, said toaster comprising:
   a body having a generally horizontal top and a base spaced vertically downwardly therefrom;
   adjacent first and second slots in said body extending vertically downwardly from said top into said body, each said slot having an inlet of predetermined maximum length and width and opposite inner and outer sides extending from the length of said inlet toward said base;
   electrical heating elements connected in a circuit and fixed adjacent said opposite inner and outer sides for toasting items received within said slots;
   a platen including portions movable vertically within each slot for supporting an item to be toasted in each slot;

a panel in said body extending vertically downwardly from said top into said body between said slots, said panel having an appreciable width running between said inlets in comparison to the width of said inlets, a length corresponding to the length of each of said inlets, and opposite sides coincident with said inner sides of said slots, the heating elements adjacent said inner sides being fixed in said panel; and securing means removably retaining said panel in place in said body between said slots for ready removal from the body;

said panel being readily selectively removable from said body by vertical displacement of the panel from the body along with the electrical heating elements fixed thereto such that said body is left with a third slot having an inlet of width equal to the sum of the widths of the inlets of each said first and second slots and said panel when said panel is removed from said body to accommodate items of greater width than the width of the inlet of either said first or second slot whereby a single item of increased width may be supported by said platen portions in said third slot.

4. The toaster of claim 3 wherein the securing means are located adjacent the top of the body and the panel and are electrically connected with the heating elements fixed to the panel for electrically connecting the electrical heating elements fixed to the panel into the circuit when the panel is retained in place in said body and disconnecting said heating means when said panel is removed from said body.

References Cited by the Examiner

UNITED STATES PATENTS

| | | | |
|---|---|---|---|
| 716,365 | 12/1902 | Bayno | 219—403 |
| 2,357,288 | 9/1944 | Ricard | 99—389 |
| 2,668,222 | 2/1954 | McCormick | 219—395 |
| 2,788,734 | 4/1957 | Weeks | 99—390 |
| 2,798,930 | 7/1957 | Frost | 219—403 X |
| 2,994,760 | 8/1961 | Pecoraro et al. | 219—394 |
| 3,146,338 | 8/1964 | Seremak | 219—403 |

WALTER A. SCHEEL, *Primary Examiner.*

S. P. FISHER, *Assistant Examiner.*